Jan. 27, 1959  W. P. O'BRIEN  2,871,059

FIRE HOSE NOZZLE

Filed June 7, 1956

*INVENTOR:*
WILLIAM P. O'BRIEN
BY
Marzall, Johnston, Cook & Root
ATT'YS

United States Patent Office 2,871,059
Patented Jan. 27, 1959

2,871,059

FIRE HOSE NOZZLE

William P. O'Brien, Western Springs, Ill., assignor to W. D. Allen Manufacturing Co., Chicago, Ill., a corporation of Illinois Application June 7, 1956, Serial No. 589,920

5 Claims. (Cl. 299—136)

This invention relates to fire hose nozzles.

The nozzle of the present invention is adapted to convert a stream of water into a fine mist or fog for fighting chemical fires or oil fires, as a solid stream of water would tend to spread the fire by floating or washing the burning chemicals or oil without sufficiently cutting off the supply of oxygen thereto.

It is an object of this invention to provide a new and improved fire hose nozzle for directing a spray of water against a toothed ring positioned at an adjacent discharge port to atomize the spray into a fine mist or fog.

Another object of the invention is to provide a spray ring for a fire hose nozzle wherein a number of wedge-shaped teeth extend inwardly toward a spray stem which directs a spray of water against concave arcuate surfaces of the teeth for atomizing the spray and generating a fog passing through slots between the teeth at the discharge end of the nozzle.

A further object is to provide a spray ring mounted substantially flush with the discharge end of a nozzle and to provide a method for mounting the ring, wherein a flange of malleable material may be peened or rolled over upon the ring to secure the ring within a shelf part at the end of the nozzle.

Numerous other objects and advantages will be apparent throughout the progress of the specification which is to follow.

A more complete understanding of the present invention, its mode of operation and its advantages, may be gathered from further reading of this specification, together with an inspection of the accompanying drawing in which.

Figure 1:
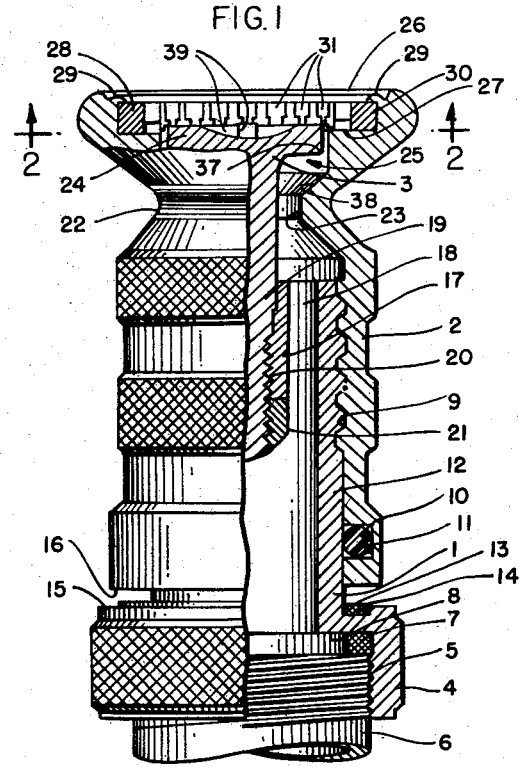
Fig. 1 is an elevational view of the fire hose nozzle of this invention, certain parts being broken away for the sake of clearness, to illustrate the underlying structure in section.
Figure 2:
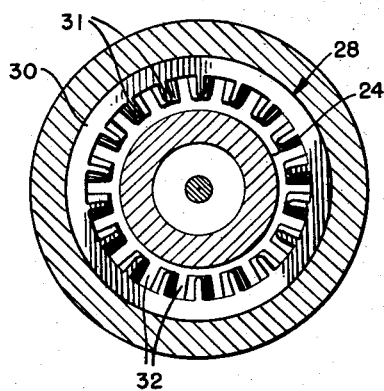
Fig. 2 is a transverse sectional view on the line 2—2 of Fig. 1.
Figure 3:
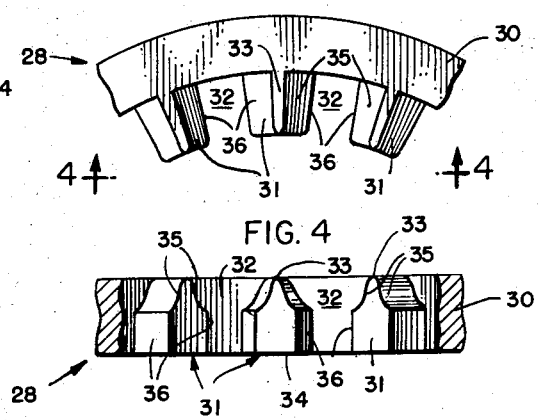
Fig. 3 is an enlarged detail fragmentary view disclosing a portion of the structure of the spray ring and the teeth thereon.

The particular construction herein shown for the purpose of illustrating the invention comprises a fire hose nozzle having a base or part 1, Fig. 1, a body 2 mounted over the base, and a spray stem 3 mounted inside of the body 2 and the base 1. The base 1 includes a hose connection end 4 of increased diameter, the end 4 having internal threads 5 for attachment to a hose fitting 6. A washer 7, formed of rubber, or other resilient material, may be seated within the broadened hose connection and against an abutting shoulder 8. The base 1 and the body 2 have cooperating threads 9 for adjustably securing the body 2 over the base 1. In a preferred embodiment of this invention, the body mounting threads 9 may be acme threads having a double lead with four threads per inch. An O ring 10 of a resilient material, such as neoprene, is seated in a circumferential groove 11 on the inside of the body 2 to bear resiliently against a shank portion 12 of the base 1. The neoprene washer 10 provides an effective seal to prevent water under pressure from bypassing the threads 9 and escaping through the rear part of the nozzle. Another resilient washer 13 of a material such as wax treated leather may be seated within a groove 14 to provide a slight cushioning between a shoulder surface 15 of the base 1 and an end surface 16 of the body 2. Thus, if the body 2 were twisted to a full open position on the base 1, the body would move downwardly on the threads 9 and the leather washer 13 would prevent a metal-to-metal contact between the surfaces 15 and 16.

The body 2 includes the shank part 12 with the threads 9 at the upper end thereof, and further, includes a central stem supporting structure 17 integral with the shank part and hose connection end, but having longitudinal openings 18 extending longitudinally therethrough to constitute water passages.

The spray stem 3 includes an elongated shank 19. The shank 19, of the spray stem 3, and the central supporting structure 17 of the base 1, have cooperating threads 20 for supporting the spray stem 3. Thus, the spray stem 3 may be screwed into the central supporting structure 17, and a lock nut 21 may be positioned thereon to secure the spray stem 3 permanently in place.

The body 2 is formed with a reduced diameter or neck part 22, and an inwardly projecting shoulder 23 within the neck 22 forms a passage of reduced diameter through which the water may flow. The spray stem 3, in addition to the shank part 19, contains a flat head 24 of increased diameter which is positioned in spaced relation forwardly of the shoulder 23. Water flowing from the reduced diameter passage, defined by the shoulder 23, thence moves to a discharge chamber 25 and is directed outwardly by the head 24 of the spray stem 3.

The forward or discharge end 26 of the nozzle is of enlarged diameter and is formed of smoothly rounded surfaces. A shoulder part 27 is formed forwardly of the discharge chamber 25 by a further enlargement of the diameter of the passage, there being a spray ring 28 seated therein. The spray ring 28 may be secured upon the shoulder 27 by peening, rolling or otherwise cold-working a flange 29 until it assumes the rounded configuration over the peripheral part of the spray ring 28, as illustrated at the top of Fig. 1.

The spray ring 28 comprises, generally, a circular peripheral part or rim 30 and a plurality of uniformly spaced teeth 31 formed integral with the peripheral part and extending inwardly therefrom. The teeth 31 extend into a spaced relation with the normal positioning of the head 24 of the spray stem 3 and water may be sprayed outwardly from the head 24 into cavities formed between adjacent teeth 31 and further defined by the rim part 30 and the shoulder 27. The teeth function to break the spray of water into fine droplets or mist which may then pass through slots 32 formed by each adjacent pair of teeth 31.

Figure 4:
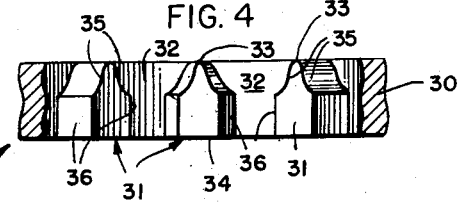
Fig. 4 is a detail sectional view on the line 4—4 of Fig. 3 and showing a fragmentary part of the spray ring.

Each of the teeth is generally wedge-shaped and is symmetrical about a plane extending radially through the central axis of the nozzle and of the spray ring 28. The teeth 31, Fig. 4, are formed with narrow curved surfaces 33 rearwardly or on the inner side of the spray ring as the ring is positioned in the nozzle. Each tooth 31 has a broadened surface 34 forwardly and on the outer side of the spray ring substantially flush with the discharge end 26 of the nozzle. Each side of each tooth has a concave arcuate surface 35 extending from the narrow curved surface 33 at the rearward side of the spray ring 28, and has a flat surface 36 extending between the arcuate surface 35 and the broadened surface 34 at the discharge side of the spray ring 28. Each adjacent pair of teeth 31 define the slot 32. The flat sides 36 of each tooth converge such that the end extending radially inwardly is of less dimension than the base part of the tooth adjacent to the peripheral rim 30. Although the teeth 31 converge radially, the slots formed therebetween have parallel sides. The inner sides 36 of two adjacent teeth 31 will be parallel and form a slot 32 which is substantially rectangular in shape. Thus, the teeth 31 project inwardly of the rim 30, and are convergent, while the slots 32 formed therebetween have parallel sides.

The spray of water may be adjusted by rotating the body part 2 about the base 1, thereby moving the body linearly with respect to the base, since the body is secured to the base by the threads 9. The spray stem 3, secured to the base 1, will likewise move forwardly or rearwardly with respect to the body as the body is rotated. In one extreme position, a ground bias surface 37 of the spray stem will seat against a biased surface 38 on the shoulder 23 of the body 2. In this latter position, the nozzle is closed, and water is prevented from flowing therethrough. In an open position, the head 24 of the spray stem 3 is moved forwardly by adjustment or turning of the body 2 on the base 1 and comes into spaced relation substantially in the same plane as the spray ring 28. In the open position, water will be permitted to flow through the nozzle, will be sprayed outwardly by the head 24 of the spray stem 3, and will be atomized by the teeth 31 of the spray ring 28.

The threads 20 securing the spray stem 3 to the supporting structure 17 may be left-handed such that there will be no tendency for the spray stem to become loose as the nozzle is adjusted along the adjusting threads 9.

The face of the head 24 on the spray stem 3 may be machined to have intercepting grooves 39, Fig. 1, to permit the application of a wrench for removal thereof. The grooves 39 may be dimensioned so that the spray stem 3 may be conveniently removed by a coin, such as a quarter-dollar, receivable in a groove.

A feature of this invention resides in the mounting and positioning of the toothed spray ring 28 at the discharge end 26 of the nozzle. The atomizing of the water spray is thus accomplished as the water leaves the nozzle to permit mixing with air to create a fog. The flush mounting of the spray ring 28 is superior to a construction wherein the water is mixed with the air internally to create a fog, since in an internal construction, air would necessarily have to be injected into a mixing chamber and would need to be conducted thereto by means such as tubes or pipes. The mixing of the air by the spray ring 28 of the present invention is essentially accomplished as the water leaves the nozzle in a simple arrangement which may be economically constructed, and may be light in weight and maneuverable to be very useful in directing fog or mist of water toward a fire.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A fog nozzle comprising a hollow base, a hollow body having a fog discharge end, said base and said body having cooperating threads adjustably securing the body to the base, said body having an inwardly projecting shoulder forming a discharge passage of reduced diameter, a spray stem having an elongated shank and a head of increased diameter, the shank and the base having cooperating threads securing the spray stem with the head thereof positioned in spaced relation with the shoulder in the body, and a spray ring mounted substantially flush with the discharge end of the body, said spray ring having inwardly projecting teeth in spaced relation with the head of the spray stem, said spray stem being operable to direct a spray of water outwardly into the teeth of the spray ring, each of the teeth of the spray ring being wedge-shaped and having symmetrical opposed sides each having a concave surface and a flat surface, the flat surfaces of each adjacent pair of teeth forming a parallel-sided slot extending radially of said spray ring.

2. A fog nozzle according to claim 1 wherein each of the teeth of the spray ring decreases in lateral dimension as the tooth projects inwardly such that each adjacent pair of teeth form a radial slot having parallel sides.

3. A fog nozzle comprising a hollow base, a hollow body having a fog discharge end adjustably mounted on the base, said body having an inwardly projecting shoulder forming a discharge passage of reduced diameter, a spray stem attached to the base and extending through the discharge passage, said spray stem having a head adjustably positioned in spaced relation with the projecting shoulder for directing a spray of water outwardly, and a spray ring having inwardly projecting teeth for atomizing the spray of water, said spray ring being positioned at the discharge end of the nozzle, the discharge end of said body having a recessed shelf for receiving the spray ring and having a flange for retaining the spray ring therein, said flange being cold-rolled over the spray ring thereby securing the spray ring upon the shoulder.

4. In a fog nozzle having a hollow body with a fog discharge end and with an internally mounted spray stem having a head for directing a spray of water outwardly at the discharge end, a spray ring mounted substantially flush with the discharge end of the body to atomize the water sprayed outwardly by the spray stem, said spray ring comprising a circular peripheral part and a plurality of uniformly spaced inwardly extending wedge-shaped teeth, each of said teeth having symmetrical opposed sides each having a concave arcuate surface and a flat surface, the surfaces of each adjacent pair of teeth forming a slot extending radially of the spray ring.

5. In a fog nozzle having a hollow body with a fog discharge end and with an internally mounted spray stem having a head for directing a spray of water radially outwardly at the discharge end, a spray ring mounted substantially flush with the discharge end of the body and in spaced relation with the spray stem to receive and atomize the spray of water, said spray ring comprising a circular peripheral part and a plurality of uniformly spaced teeth integral with the peripheral part and extending radially inwardly therefrom, each tooth being wedge-shaped with a narrow rounded surface on the inner side of the spray ring and having a broadened surface on the outer side of the spray ring, each tooth being symmetrical about a plane extending radially from the circular axis of the ring, each tooth having concave arcuate surfaces extending from the narrow rounded inner surface and having flat surfaces extending between the arcuate surfaces and the broadened outer surface, each adjacent pair of teeth forming a radial slot having parallel sides for passing fog through the discharge end of the nozzle.

References Cited in the file of this patent

UNITED STATES PATENTS

| | | |
|---|---|---|
| 785,271 | Richey et al. | Mar. 21, 1905 |
| 1,504,000 | Simmons | Aug. 5, 1924 |
| 2,012,623 | Boyd | Aug. 27, 1935 |
| 2,560,799 | Johnson | July 17, 1951 |
| 2,657,955 | Manning | Nov. 3, 1953 |
| 2,678,847 | Caird | May 18, 1954 |

FOREIGN PATENTS

| | | |
|---|---|---|
| 132,676 | Sweden | May 17, 1950 |